United States Patent [19]

Lee

[11] Patent Number: 5,104,946
[45] Date of Patent: Apr. 14, 1992

[54] SOLUTIONS OF POLYIMIDESILOXANES IN BUTYROLACTONE

[75] Inventor: Chung J. Lee, Amherst, N.Y.

[73] Assignee: Occidental Chemical Corporation, Niagara Falls, N.Y.

[21] Appl. No.: 456,753

[22] Filed: Dec. 26, 1989

[51] Int. Cl.$^5$ .................. C08F 283/00; C08G 77/04; C08G 69/26; C08G 8/02

[52] U.S. Cl. .................. 525/477; 525/426; 528/26; 528/28; 528/125; 528/128; 528/170; 528/172; 528/173; 528/350; 528/353

[58] Field of Search .................. 528/26, 28, 38, 41, 528/125, 128, 170, 172, 173, 229, 353, 350; 427/387, 372.2; 524/110, 111; 525/477, 426

[56] References Cited

U.S. PATENT DOCUMENTS

| | | | |
|---|---|---|---|
| 3,325,450 | 6/1967 | Holub | 528/26 |
| 3,553,282 | 1/1971 | Holub | 528/26 |
| 4,829,131 | 5/1989 | Chung Lee | 528/41 |

OTHER PUBLICATIONS

St. Clair et al., Structure-Solubility Relationship in Polymers, Acadeny Press Inc., N.Y., N.Y. pp. 199-214, 1977.

*Primary Examiner*—Morton Foelak
*Assistant Examiner*—P. Hampton-Hightower
*Attorney, Agent, or Firm*—James F. Tao; Richard D. Fuerle

[57] ABSTRACT

Disclosed is a solution in butyrolactone of a diglyme-insoluble polyimidesiloxane. The polyimidesiloxane is the reaction product of a dianhydride selected from the group consisting of 3,3',4,4'-benzophenone tetracarboxylic acid dianhydride, 3,3',4,4'-oxydiphthalic anhydride, and mixtures thereof, with a mixture of a non-siloxane diamine and a siloxane diamine in a molar ratio of about 0.1 to about 16, where said non-siloxane diamine is selected from the group consisting of 2,4-diaminotoluene, 3,5-diamino-tert-butylbenzene, 2,5-diamino-trifluoromethyl benzene, 2,6-diamino-4-trifluoromethyl pyridine, and mixtures thereof.

18 Claims, No Drawings

SOLUTIONS OF POLYIMIDESILOXANES IN BUTYROLACTONE

BACKGROUND OF INVENTION

This invention relates to solutions of polyimidesiloxanes in butyrolactone. In particular, it relates to polyimidesiloxanes that are soluble in butyrolactone, but are not soluble in diglyme.

Because of their high-temperature stability, low dielectric constant, and excellent physical properties, polyimidesiloxanes are desirable polymers for use in making circuit boards and for coating wire and cable, as well as many other applications that require those properties. For many of these applications, the polyimidesiloxane must be applied from a solution. Diglyme (diethylene glycol dimethyl ether) and N-methyl pyrrolidinone (NMP) are often used to form solutions of polyimidesiloxanes. However, for many applications diglyme cannot be used because it is flammable and it will not dissolve a polyimidesiloxane having a low siloxane content, which is required to give a high $T_g$. NMP is a good solvent for polyimidesiloxanes, but because it has a high boiling point and is polar it is difficult to remove, and high temperatures and long periods of time are required to evaporate it completely.

Butyrolactone would be a desirable solvent for polyimidesiloxanes because it is less flammable than diglyme and can dissolve polyimidesiloxanes having a lower siloxane content than diglyme. Compared to NMP, butyrolactone is less polar, and therefore can be removed by evaporation more easily. However, until now, particular polyimidesiloxane polymers that are soluble in butyrolactone have not been specifically identified. In addition, in some applications, diglyme is used as a cleaning solvent, or as a solvent to apply coatings of other materials over a coating of butyrolactone. For those applications it would be necessary to have polyimidesiloxanes that are soluble in butyrolactone, but are not soluble in diglyme. However, the solubility of a particular polyimidesiloxane in a particular solvent is not a well-understood phenomena. At the present time chemistry has not advanced sufficiently to enable one skilled in the art to predict which polyimidesiloxanes will be soluble in butyrolactone, but will not be soluble in diglyme.

SUMMARY OF THE INVENTION

After testing a large number of different polyimidesiloxanes I have discovered that the only polyimidesiloxanes that are soluble in butyrolactone but are not soluble in diglyme are those made from the diamines: 2,4-diaminotoluene, 3,5-diamino-tert-butylbenzene, 2,5-diamino-trifluoromethyl benzene, and 2,6-diamino-4-trifluoromethyl pyridine, and the dianhydrides: 3,3',4,4'-benzophenone tetracarboxylic dianhydride and 3,3',4,4'-oxydiphthalic anhydride.

The polyimidesiloxanes of this invention retain the desirable properties of other typical polyimidesiloxanes, such as high-temperature stability, low dielectric constant, and excellent physical properties.

DESCRIPTION OF THE INVENTION

The polyimidesiloxanes of this invention can be prepared according to the well-known reaction of a dianhydride with a diamine, which proceeds to an intermediate amic acid stage before reaching the final imide product:

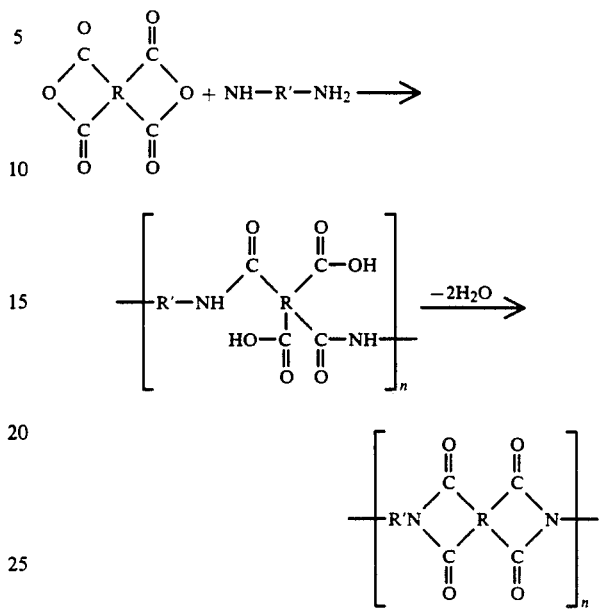

In the above reaction, the dianhydride reacts stoichiometrically with the diamine.

The diamine monomer consists of a molar ratio of siloxane diamine monomer to non-siloxane diamine monomer of about 0.1 to about 16 (i.e., from one-tenth mole of non-siloxane diamine and one mole of siloxane diamine up to 16 moles of non-siloxane diamine and 1 mole of siloxane diamine). If too much siloxane diamine is used, the polymer is too rigid and its melting point is too high, and it may be insoluble, and if too little siloxane diamine is used, the polymer may be too flexible and may have poor mechanical strength. Preferably, the molar ratio of non-siloxane diamine to siloxane diamine is about 1 to about 5.

A siloxane diamine is a diamine that contains at least one

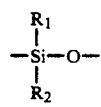

group, where $R_1$ and $R_2$ are organic. Examples of suitable siloxane diamines include compounds having the general formula:

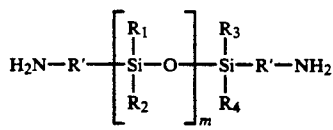

where $R_1$, $R_2$, $R_3$, and $R_4$ are each independently selected from a substituted or unsubstituted aliphatic mono-radical of 1 to 12 carbon atoms or substituted or unsubstituted aromatic mono-radical of 6 to 10 carbon atoms, R' is similar, but is a di-radical, and "m" is 1 to 200. Examples of suitable mono-radicals include —$CH_3$, —$CF_3$, —$(CH_2)_n CF_3$, —$C_6H_5$, —$CF_2$—$CHF$—$CF_3$, and

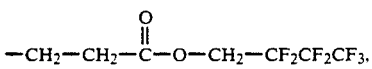

and examples of suitable di-radicals include $-(CH_2)_n-$, $-(CF_2)_n-$, $-(CH_2)_nCF_2-$, $-C_6H_4-$, and $-X-A-Y-$, where X and Y are independently selected from O, S, and

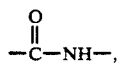

"A" is an aryl di-radical, and "n" is 1 to 10. Because of its availability and low cost, the preferred siloxane diamine is

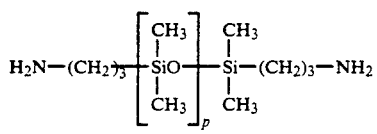

where "p" is 1 to 200, and is preferably 1 to 20.

The non-siloxane diamine used in this invention is 2,4-diaminotoluene, 3,5-diamino-tert-butylbenzene, 2,5-diamino-trifluoromethyl benzene, 2,6-diamino-4-trifluoromethyl pyridine, or a mixture thereof. The dianhydride used in this invention is 3,3',4,4'-benzophenone tetracarboxylic dianhydride, 3,3',4,4'-oxydiphthalic anhydride, or a mixture thereof.

The polyimidesiloxanes are prepared in solution. The solvent used must dissolve not only the starting materials and the polyamic acids, but must also dissolve the polyimidesiloxane product. Suitable solvents include N-methylpyrrolidinone (NMP) and butyrolactone (sometimes referred to as γ-butyrolactone). The preferred solvent is butyrolactone, of course, since the object of the invention is to prepare a solution in butyrolactone. The solids content of the solution can vary from about 5% by weight solids or less up to the solubility limit, but the solids content is preferably about 10 to about 25% by weight because at greater solids content the viscosity is too high to mix easily, and a lower solids content is uneconomical.

In a commercial or large-scale production, the polyimidesiloxane can be prepared in two stages. The first stage is an exothermic reaction which results in the production of a polyamic acid siloxane. The first stage reaction occurs spontaneously and its completion is noted by the cessation of the exotherm. In the second stage, water is condensed out to form the imide ring. In the second stage reaction, it is advantageous to add a solvent that forms a azeotrope with water. The reaction mixture can then be heated above the azeotropic boiling point until no more water is emitted. The solution, preferably in butyrolactone, can then be applied to various articles which can then be heated to evaporate the butyrolactone and form a polyimidesiloxane coating on the article.

The following example further illustrates this invention.

EXAMPLE

A solution of NMP of a dianhydride, a siloxane diamine having the general formula

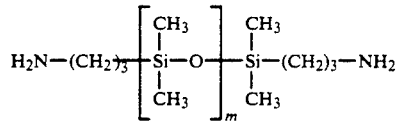

and a non-siloxane diamine was reacted at room temperature for about 4 to about 16 hours to prepare a polyamic acid siloxane. The polyamic acid siloxane was poured into a polytetrafluoroethylene mold and was reacted at about 140° C. for about 4 hours, then at about 250° C. for about 15 to 30 minutes in a forced air oven to prepare a polyimidesiloxane. Samples of the polyimidesiloxane were tested for solubility in butyrolactone and in diglyme by immersion of a 1 gram sample of the polyimidesiloxane in 10 grams of solvent at room temperature for 24 hours; the polyimidesiloxane was considered to be soluble only if it completely dissolved. The table which follows gives the results of many of those tests.

The following code is used in the table:

| Code | Anhydrides |
|---|---|
| P | 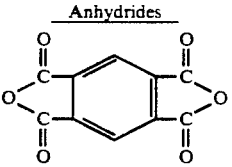 |
| B | 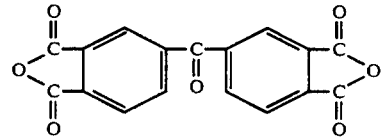 |
| B' | 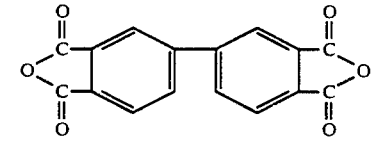 |

| Code | |
|---|---|
| O | 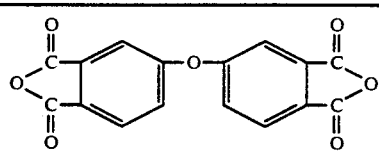 |
| F | 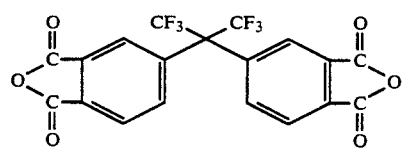 |
| H | 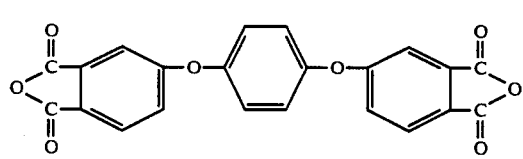 |
| U | 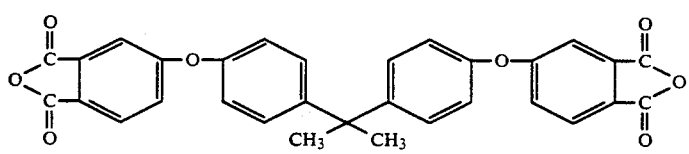 |
Diamines
| | |
|---|---|
| T | 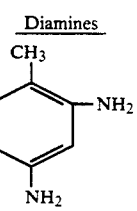 |
| E | 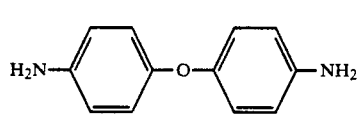 |
| Ft | 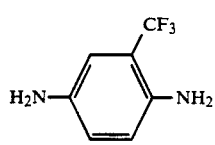 |
| Fp | 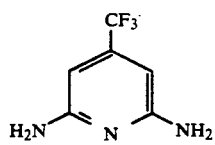 |
| T' | 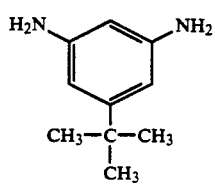 |
| P' | 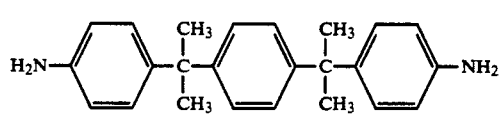 |

-continued

| Code | |
|---|---|
| Us' | 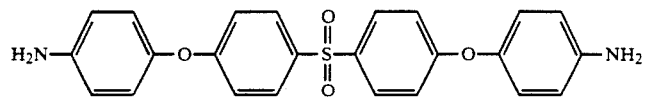 |

| | Composition | | | (1) | Siloxane Diamine | Soluble In | |
|---|---|---|---|---|---|---|---|
| Test No. | Dianhydride | Non-Siloxane Diamine | "m" in Formula | Molar Ratio | (% of total polymer) | Butyrolactone? | Diglyme? |
| 1 | B | E | 9 | 2 | 38 | No | No |
| 2 | B | M | 9 | 2 | 38 | No | No |
| 3 | B | T | 13 | 1 | 58 | Yes | No |
| 4 | B | T | 9 | 1 | 53 | No | No |
| 5 | B | T | 9 | 3 | 34 | No | No |
| 6 | B | T | 9 | 5 | 25 | Yes | No |
| 7 | B | T | 7.5 | 1 | 49 | Yes | No |
| 8 | B | T | 7.5 | 3 | 34 | Yes | No |
| 9 | B | T | 7.5 | 5 | 25 | Yes | No |
| 10 | B | T | 1 | 1 | 24 | No | No |
| 11 | B | T | 1 | 5 | 9 | No | No |
| 12 | B' | T | 7.5 | 2 | 39 | No | No |
| 13 | B' | .5F + .5T | 7.5 | 2 | 38 | Yes | Yes |
| 14 | B' | .5F + .5T | 7.5 | 3 | 31 | Yes | Yes |
| 15 | B' | .7E + .3T | 9 | 2 | 42 | No | No |
| 16 | B' | .5E + .5T | 9 | 2 | 42 | No | No |
| 17 | H | T | 9 | 2 | 37 | No | No |
| 18 | O | T | 7.5 | 0.1 | 68 | Yes | Yes |
| 19 | O | T | 7.5 | 1 | 49 | Yes | Yes |
| 20 | O | T | 7.5 | 2.5 | 34 | Yes | No |
| 21 | O | T | 9 | 1 | 53 | Yes | Yes |
| 22 | O | T | 9 | 2 | 41 | Yes | Yes |
| 23 | O | T | 9 | 2.5 | 38 | Yes | Yes |
| 24 | O | T | 9 | 3 | 34 | Yes | No |
| 25 | O | T | 12 | 1 | 59 | Yes | Yes |
| 26 | O | T | 12 | 1.5 | 52 | Yes | No |
| 27 | O | T | 12 | 2 | 47 | Yes | No |
| 28 | O | T | 12 | 2.5 | 43 | Yes | No |
| 29 | O | T | 12 | 3 | 40 | Yes | No |
| 30 | O | T | 12 | 3.5 | 35 | Yes | No |
| 31 | U | T | 9 | 2 | 31 | Yes | Yes |
| 32* | B | Ft | 1 | 1.3 | 20 | No | No |
| 33* | B | Ft | 1 | 0.5 | 30 | Yes | No |
| 34* | B | Ft | 1 | 0.1 | 40 | Yes | Yes |
| 35* | B | Ft | 7.5 | 5 | 20 | No | No |
| 36* | B | Ft | 7.5 | 2.7 | 30 | No | No |
| 37* | B | Ft | 7.5 | 1.5 | 40 | No | No |
| 38* | B | Ft | 12 | 7.7 | 20 | No | No |
| 39* | B | Ft | 12 | 4.3 | 30 | No | No |
| 40* | B | Ft | 12 | 2.5 | 40 | No | No |
| 41 | B | Fp | 9 | 3 | 32 | Yes | No |
| 42 | B | T' | 9 | 16 | 10 | No | No |
| 43* | B | T' | 9 | 3 | 33 | Yes | No |
| 44* | B | T' | 9 | 2.5 | 36 | Yes | No |
| 45* | B | P' | 9 | 2.5 | 29 | No | No |
| 46 | B | P' | 9 | 2.5 | 29 | No | No |
| 47* | B' | Fp | 9 | 3 | 21 | Yes | Yes |
| 48* | B' | Ft | 1 | 0.18 | 40 | No | Yes |
| 49* | B' | Ft | 1 | 0.55 | 30 | No | No |
| 50* | B' | Ft | 7.5 | 1.65 | 40 | No | No |
| 51* | B' | Ft | 7.5 | 2.9 | 30 | No | No |
| 52* | B' | Ft | 12 | 2.75 | 40 | No | No |
| 53* | B' | Ft | 12 | 4.55 | 30 | No | No |
| 54 | B' | T' | 9 | 16 | 10 | No | No |
| 55* | B' | T' | 9 | 3 | 34 | No | No |
| 56* | B' | T' | 9 | 2.5 | 37 | No | No |
| 57* | O | Fp | 9 | 3 | 30 | Yes | Yes |
| 58* | O | 0.6Fp + 0.3T | 9 | 4 | 27 | Yes | Yes |
| 59* | O | Ft | 1 | 0.13 | 40 | Yes | Yes |
| 60* | O | Ft | 1 | 1.6 | 30 | No | No |
| 61* | O | Ft | 7.5 | 1.6 | 40 | Yes | No |
| 62* | O | Ft | 7.5 | 2.8 | 30 | No | No |
| 63* | O | Ft | 12 | 2.6 | 40 | No | No |
| 64* | O | P' | 9 | 2.5 | 31 | Yes | Yes |
| 65* | F | P' | 9 | 2.5 | 26 | Yes | Yes |
| 66 | O | T' | 9 | 16 | 10 | No | No |
| 67 | O | T' | 9 | 3 | 33 | Yes | Yes |
| 68 | B | Us' | 9 | 3.5 | 22 | No | No |

-continued

| Test No. | Composition Dianhydride | Non-Siloxane Diamine | "m" in Formula | (1) Molar Ratio | Siloxane Diamine (% of total polymer) | Soluble In Butyrolactone? | Diglyme? |
|---|---|---|---|---|---|---|---|
| 69 | B | Us' | 12 | 3.5 | 26 | No | No |
| 70 | B' | Us' | 9 | 3.5 | 22 | No | No |
| 71 | B' | Us' | 12 | 3.5 | 27 | No | No |
| 72 | O | Us' | 9 | 3.5 | 20 | No | No |
| 73 | O | Us' | 12 | 3.5 | 24 | No | No |
| 74 | P | Us' | 9 | 3.5 | 25 | No | No |

(1) Non-Siloxane Diamine to Siloxane Diamine
*Dianhydride and siloxane diamine reacted before non-siloxane diamine was added.

The preceding table shows that of the 74 different polyimidesiloxanes tested for solubility only 6 were soluble in butyrolactone, but were not soluble in diglyme. The table also shows that solubility in butyrolactone and insolubility in diglyme depend upon the particular dianhydrides and diamines used, the "m" value of the siloxane diamine, and the percent of siloxane diamine, and that no simple rule can define the relationship between these variables and solubility in butyrolactone and diglyme.

I claim:

1. A solution in butryolactone of a diglyme-insoluble polyimidesiloxane which comprises the reaction product of a dianhydride selected from the group consisting of 3,3',4,4'-benzophenone tetracarboxylic dianhydride, 3,3'4,4'-oxydiphthalic anhydride, and mixtures thereof, with a stoichiometric amount of a mixture of a non-siloxane diamine and a siloxane diamine in a molar ratio of about 0.1 to about 16, where said non-siloxane diamine is selected from the group consisting of 2,4-diaminotoluene, 3,5-diamino-tert- butylbenzene, 2,5-diamino-trifluoromethyl benzene, 2,6-diamino-4-trifluoromethyl pyridine, and mixtures thereof.

2. A solution according to claim 1 wherein said diamine is 2,4-diaminotoluene and said dianhydride is 3,3',4,4'-benzophenone tetracarboxylic dianhydride.

3. A solution according to claim 1 wherein said diamine is 3,5-diamino-tert-butylbenzene and said dianhydride is 3,3',4,4'-benzophenone tetracarboxylic dianhydride.

4. A solution according to claim 1 wherein said diamine is 2,5-diamino-trifluoromethyl benzene and said dianhydride is 3,3',4,4'-benzophenone tetracarboxylic dianhydride.

5. A solution according to claim 1 wherein said diamine is 2,4-diaminotoluene and said dianhydride is 3,3',4,4'-oxydiphthalic anhydride.

6. A solution according to claim 1 wherein said diamine is 2,5-diamino-trifluoromethyl benzene and said dianhydride is 3,3',4,4'-oxydiphthalic anhydride.

7. A solution according to claim 1 wherein said siloxane diamine has the formula

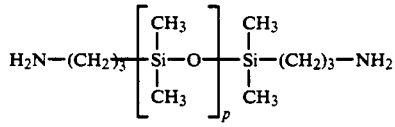

where "p" is 1 to 200.

8. A solution according to claim 7 wherein "p" is 1 to 20.

9. A solution according to claim 1 which has a solids content of about 10 to about 25% by weight.

10. A method of making a coated article comprising applying a solution according to claim 1 to said article and heating said solution to evaporate said butyrolactone therefrom.

11. A method according to claim 10 wherein said diamine is 2,4-diaminotoluene and said dianhydride is 3,3'4,4'-benzophenone tetracarboxylic dianhydride.

12. A method according to claim 10 wherein said diamine is 3,5-diamino-tert-butylbenzene and said dianhydride is 3,3',4,4'-benzophenone tetracarboxylic dianhydride.

13. A method according to claim 10 wherein said diamine is 2,5-diamino-trifluoromethyl benzene and said dianhydride is 3,3'4,4'-benzophenone tetracarboxylic dianhydride.

14. A method according to claim 10 wherein said diamine is 2,4-diaminotoluene and said dianhydride is 3,3'4,4'-oxydiphthalic anhydride.

15. A method according to claim 10 wherein said diamine is 2,5-diamino-trifluoromethyl benzene and said dianhydride is 3,3'4,4'-oxydiphthalic anhydride.

16. A method according to claim 10 wherein said siloxane diamine has the formula

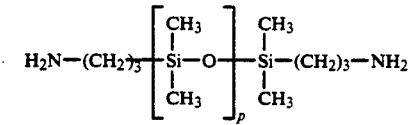

where "p" is 1 to 200.

17. A method according to claim 16 wherein "p" is 1 to 20.

18. A method according to claim 10 wherein said solution has a solids content of about 10 to about 25% by weight.